US007218508B2

(12) United States Patent
Chen et al.

(10) Patent No.: US 7,218,508 B2

(45) Date of Patent: May 15, 2007

(54) MOUNTING APPARATUS FOR POWER SUPPLY

(75) Inventors: Yun-Lung Chen, Tu-Cheng (TW); Da-Long Sun, Shenzhen (CN)

(73) Assignees: Hong Fu Jin Precision Industry (Shenzhen) Co., Ltd., Shenzhen, Guangdong (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 268 days.

(21) Appl. No.: 10/951,510

(22) Filed: Sep. 28, 2004

(65) Prior Publication Data

US 2005/0152107 A1 Jul. 14, 2005

(30) Foreign Application Priority Data

Jan. 9, 2004 (TW) .............................. 93200360 U

(51) Int. Cl.
*G06F 1/16* (2006.01)

(52) U.S. Cl. ...................... 361/679; 361/683; 361/724; 361/825

(58) Field of Classification Search ................ 361/685, 361/825
See application file for complete search history.

(56) References Cited

U.S. PATENT DOCUMENTS 5,777,848 A * 7/1998 McAnally et al. .......... 361/725
5,790,372 A * 8/1998 Dewey et al. .............. 361/683
6,256,195 B1 * 7/2001 Liao ........................... 361/685
6,582,150 B1 6/2003 Davis et al.
6,667,880 B2 * 12/2003 Liu et al. .................... 361/685
6,813,148 B2 * 11/2004 Hsu et al. ................... 361/685
2003/0090869 A1 * 5/2003 Liu et al. .................... 361/685

FOREIGN PATENT DOCUMENTS

TW 455052 9/2001
TW 500294 8/2002
TW 507895 10/2002

* cited by examiner

*Primary Examiner*—Anatoly Vortman
*Assistant Examiner*—Anthony Q. Edwards
(74) *Attorney, Agent, or Firm*—Morris Manning & Martin LLP; Tim Tingkang Xia, Esq.

(57) ABSTRACT

A mounting apparatus for securing a power supply (10) includes a chassis (50), a retainer (30) and a spring (40). The power supply includes a plurality of locking holes (12) at a sidewall thereof, and two screws (14) threaded in the sidewall. The chassis includes a side panel (51) and a rear panel (53). The side panel has two slots (54), and a plurality of locking tabs (52) engaging in the locking holes. The retainer is slidably attached to the side panel, and connected to the side panel via the spring. The retainer includes two receiving portions (33), each having a slanted guiding surface (331). A locking portion (36) is formed near one end of the guiding surface. The screws slide along the slots and the guiding surface, then snappingly engage into the locking portions, thereby securing the power supply in the chassis.

20 Claims, 5 Drawing Sheets

10
171
17
11
12
16
141
14
531
532
530
53
533
5331
52
54
59
51
50
56
57
58
32
331
33
332
39
36
37
30
40
38

MOUNTING APPARATUS FOR POWER SUPPLY

BACKGROUND OF THE INVENTION

1. Field of the Invention

The present invention relates to mounting apparatuses for power supplies, and particularly to a mounting apparatus for readily and securely attaching a power supply to a computer chassis.

2. Description of the Related Art

Generally speaking, a power supply is necessarily to be assembled in a computer enclosure. The power supply is often directly attached to a rear panel of the computer enclosure by a plurality of screws. However, the assembly or disassembly of those screws requires extra tools such as screwdrivers, and unduly laborious and time-consuming.

Another conventional mounting way is to assemble a power supply to a bracket, and then pivotally attach the bracket together with the power supply to the computer enclosure. An example is disclosed in Taiwan Patent No. 500294. However, by this way, not only a bracket but also a pivot shaft is needed and total manufacturing cost increases due to the inevitably need of making extra parts. In addition, it is inconvenient to detach the pivot shaft. Moreover, the power supply needs a rather long connection line in order to rotate outwardly.

A power supply mounting structure which does not need a bracket is disclosed in U.S. Pat. No. 6,582,150. The power supply is secured in a computer chassis by a retention member. The computer chassis comprises a top panel, a side panel and a rear panel. A support plate is formed from each of the side panel and the rear panel. A pair of spaced L-shaped hooks is formed from the top panel. A biasing mechanism is formed from the top panel at outer sides of the hooks. The retention member is an L-shaped plate, which includes an elongated axis at an end thereof to be pivotally connected to the hooks of the top panel. An L-shaped retainer is fixed to one side of the power supply. In assembly, the power supply is slid toward the rear panel, and supported on the support plates. Then the retention member rotated to abut against the retainer. The biasing mechanism biases the retention mechanism in a secured position. However, this structure includes so many elements and thus is complicated. In addition, because the power supply is directly attached under the top panel by the retention member, the movement along the direction of the elongated axis is not limited, which effects the securing reliability of the power supply.

Thus, a mounting apparatus for a power supply which solves the above-mentioned problems is strongly desired.

SUMMARY OF THE INVENTION

Accordingly, an object of the present invention is to provide a mounting apparatus with a simple structure which securely and readily allows attachment and removal of a power supply to and from a computer chassis.

To achieve the above-mentioned object, a mounting apparatus in accordance with the preferred embodiment of the present invention is used to secure a power supply. The mounting apparatus comprises a chassis, a retainer and a spring. The power supply comprises a plurality of locking holes at a sidewall thereof, and two screws threaded in the sidewall. The chassis comprises a side panel and a rear panel. The side panel has two slots, and a plurality of locking tabs engaging in the locking holes. The retainer is slidably attached to the side panel, and connected to the side panel via the spring. The retainer includes two receiving portions, each of which having a slanted guiding surface. A locking portion is formed near one end of each guiding surface. When the power supply is moved toward the rear panel, the screws slide along the slots and the guiding surface, then snappingly engage into the corresponding locking portions, thereby securing the power supply in the chassis.

In detaching the power supply, the retainer is moved upwardly, so that the screws are able to leave the locking portions. Then the power supply is able to be taken away from the rear panel.

Other objects, advantages and novel features of the present invention will be drawn from the following detailed description of a preferred embodiment of the present invention with attached drawings, in which:

DETAILED DESCRIPTION OF THE INVENTION

Figure 1:
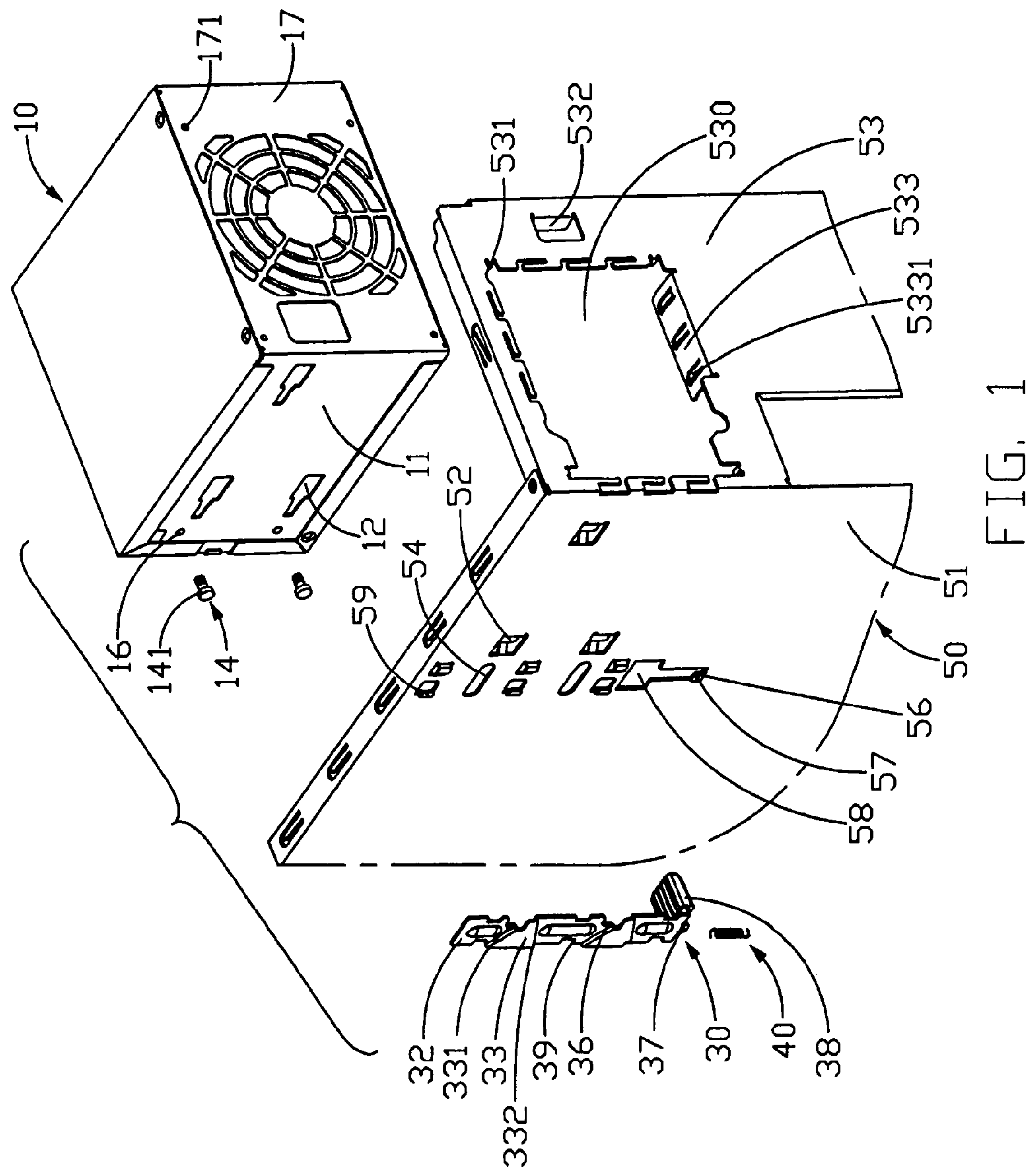
FIG. 1 is an exploded, isometric view of a mounting apparatus in accordance with the present invention, together with a power supply, the mounting apparatus comprising a computer chassis, a retainer and a spring.
Figure 2:
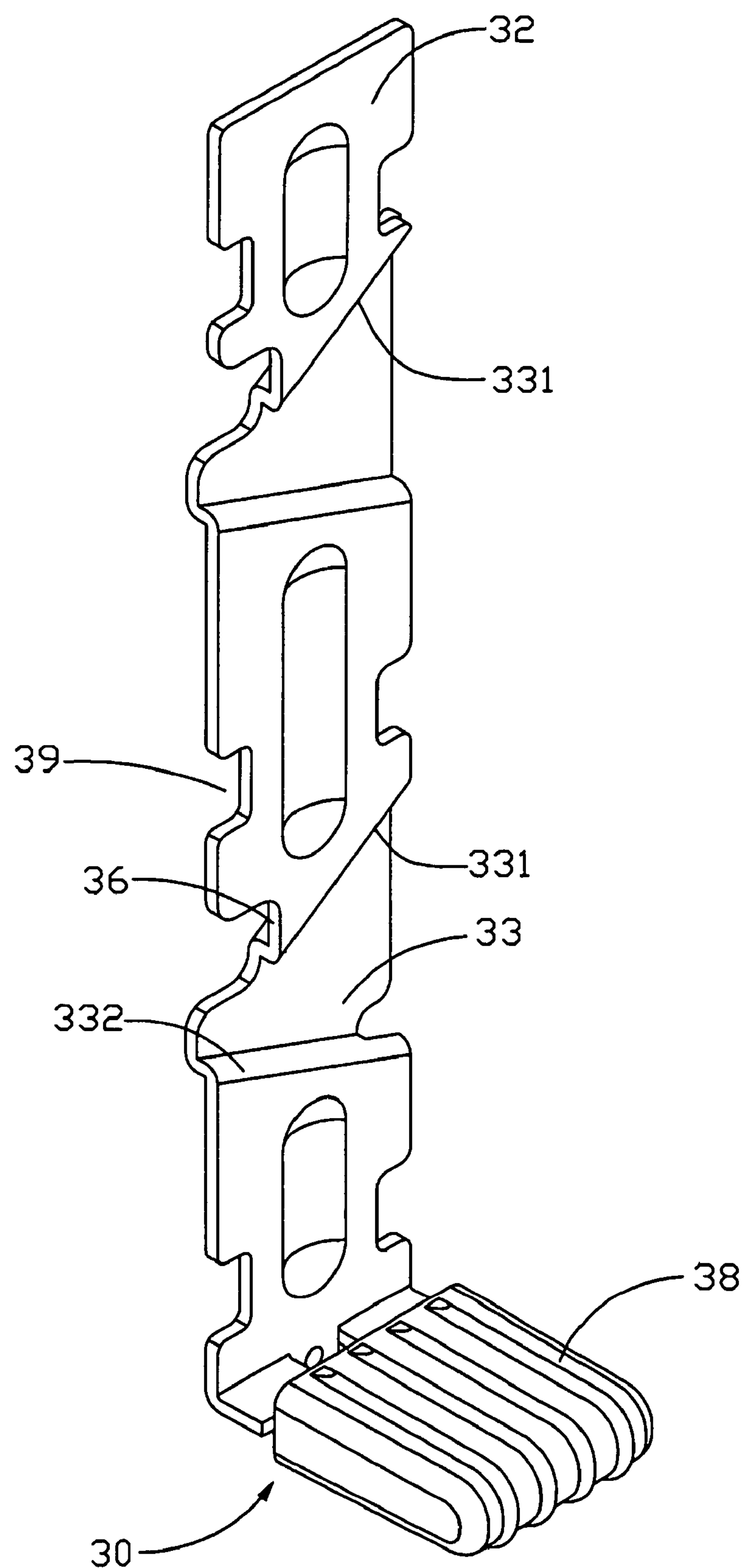
FIG. 2 is an isometric view of the retainer of FIG. 1, but viewed from another aspect.
Figure 3:
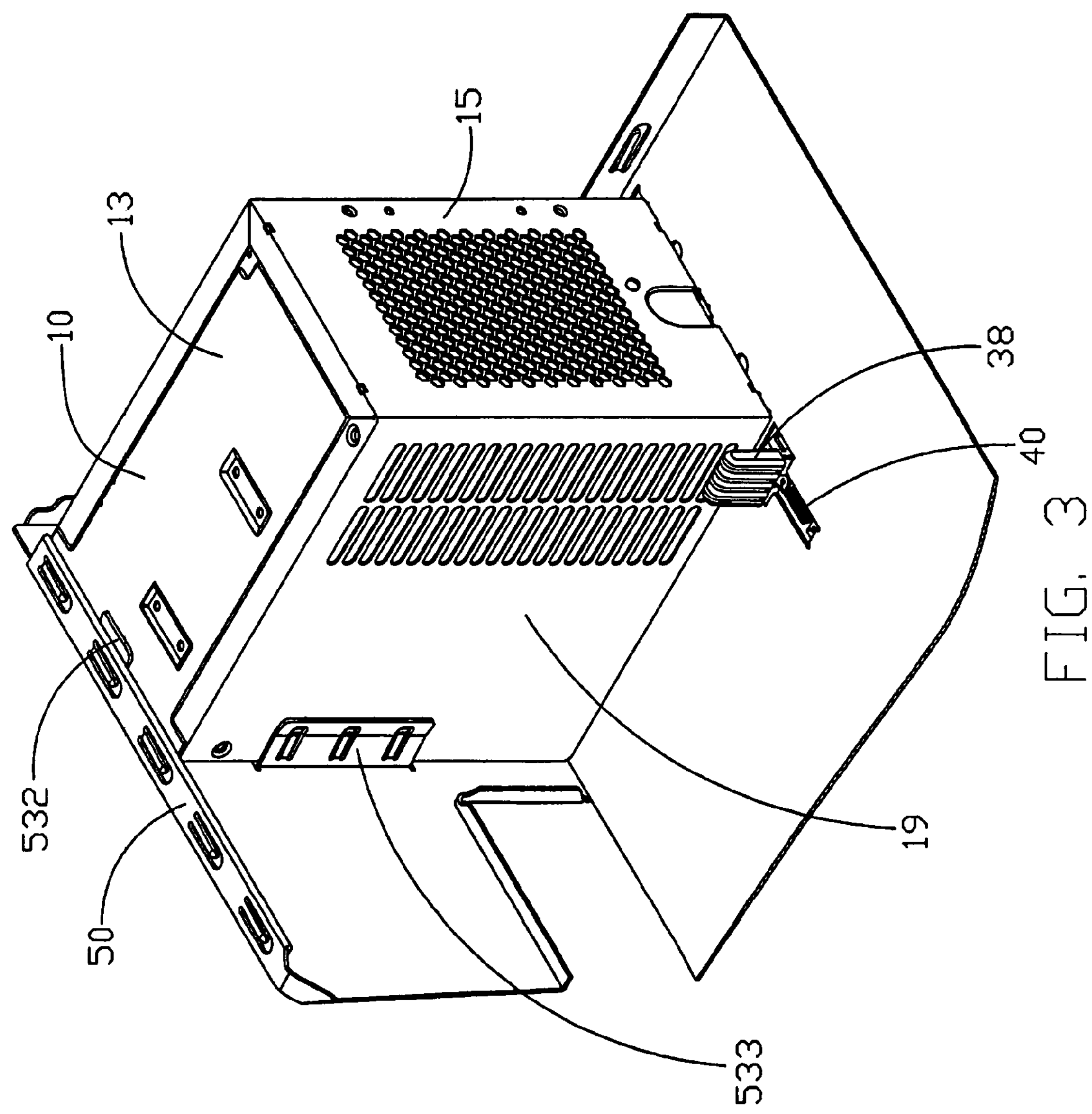
FIG. 3 is an assembled view of the mounting apparatus and the power supply of FIG. 1, but viewed from another aspect.

Referring to FIGS. 1–3, a mounting apparatus in accordance with the preferred embodiment of the present invention comprises a computer chassis 50, a retainer 30, and a resilient element such as a coil spring 40. The retainer 30 can secure a box-like electronic device such as a power supply 10 in the computer chassis 50.

The power supply 10 comprises two opposite sidewalls 11, 13, a front wall 15, a rear wall 17, and a bottom wall 19. A plurality of locking holes 12 is defined in the sidewall 11, each of which has a wide portion and a narrow portion. Two threaded holes 16 are defined in a front side of the sidewall 11. Two sliding elements such as screws 14 are threaded in the threaded holes 16, respectively. Four locating holes 171 are defined in four corners of the rear wall 17, respectively.

The retainer 30 comprises a sheet-like main body 32, and a handle 38 perpendicularly extending from a bottom end of the main body 32. Two opposite edges of the main body 32 define three pairs of cutouts 39 from the top down. Two receiving portions 33 are formed between the upper and middle pairs of cutouts 39, and between the lower and middle pairs of cutouts 39, respectively. Each receiving portion 33 defines a receiving space for a screw cap 141 of the screw 14. An upper portion of each receiving portion 33 forms a guiding surface 331 perpendicular to the main body 32. A lower portion of each receiving portion 33 forms a stopping surface 332 which is also perpendicular to the main body 32. The guiding surface 331 is a slanted surface whose front end is higher than the rear end. The stopping surface 332 is a slanted surface whose front end is lower than the rear end. The main body 32 forms a locking portion 36 in the vicinity of the rear end of the slanted surface. A through aperture 37 is defined in the bottom end of the main body 32.

The chassis 50 comprises a side panel 51, and a vertical panel such as a rear panel 53 perpendicular to the side panel 51. An upper portion of the rear panel 53 forms an opening 530. Four tabs 531 are formed inwardly from the rear panel 53 at four corners of the opening 530, corresponding to the locating holes 171 of the power supply 10. A support plate 533 is bent perpendicularly inwardly from the rear panel 53 at a bottom edge of the opening 530. A plurality of resilient fingers 5331 is stamped slightly upwardly from the support plate 533. A blocking plate 532 is stamped perpendicularly inwardly from one side of the rear panel 53, said side is away from the side panel 51.

The side panel 51 inwardly forms a plurality of locking tabs 52, corresponding to the locking holes 12 of the power supply. Each locking tab 52 is bent, and forms a wide portion and a narrow portion. Three pairs of catches 59 are formed from the side panel 51, corresponding to the cutouts 39 of the retainer 30. A sliding space is defined between the pairs of the catches 59. Two horizontal slots 54 are defined in the side panel 51, respectively between the upper and middle pairs of catches 59, and the lower and middle pairs of catches 59. A T-shaped receiving hole 58 is defined in the side panel 51 below the lower pair of catches 59. The receiving hole 58 comprises an upper wide portion and a lower narrow portion. An L-shaped bent tab 56 is stamped outwardly from a bottom end of the receiving hole 58 with a through aperture 57 defined therein.

Figure 4:
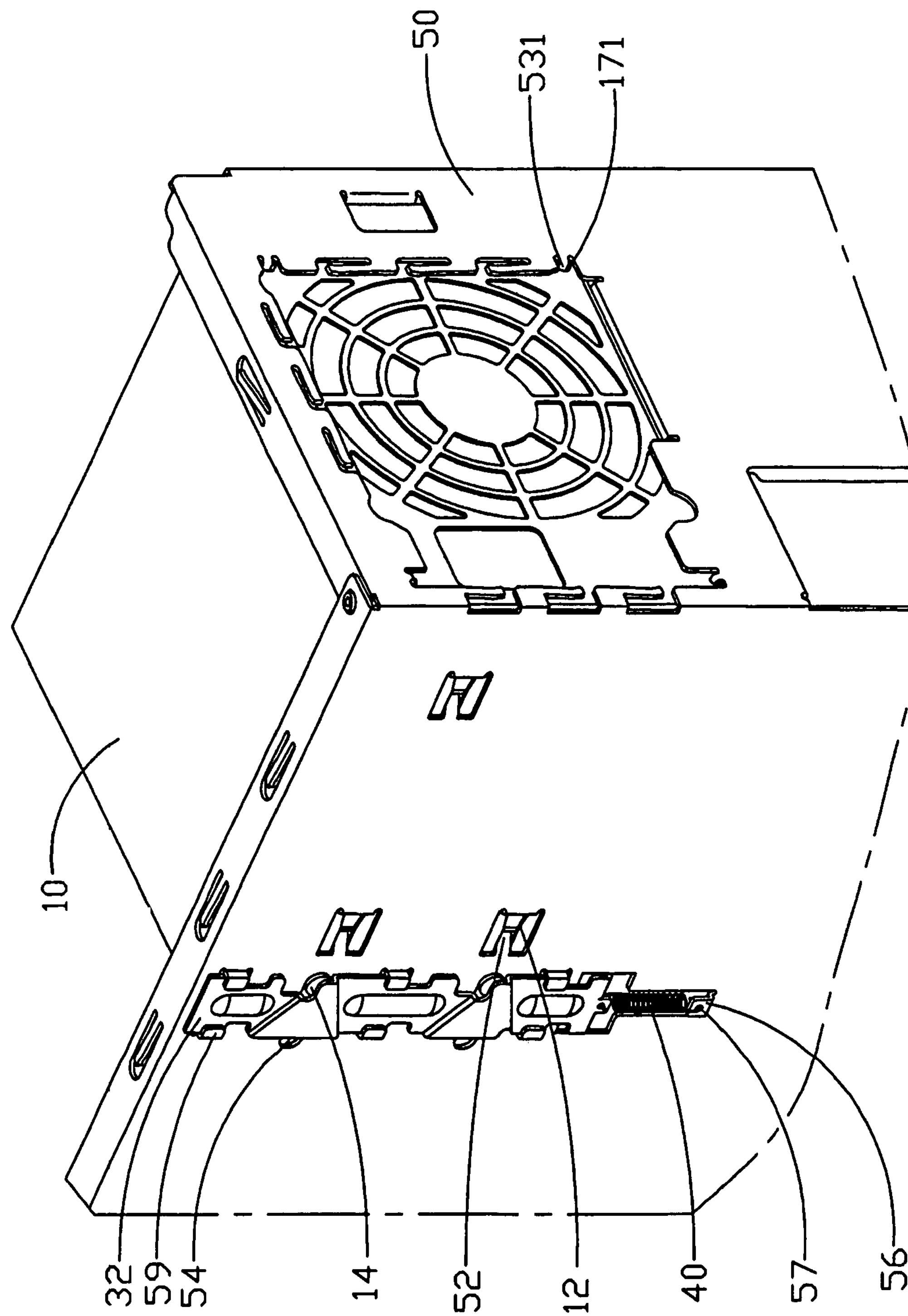
FIG. 4 is a pre-assembled view of FIG. 1, showing a state in an assembling process.
Figure 5:
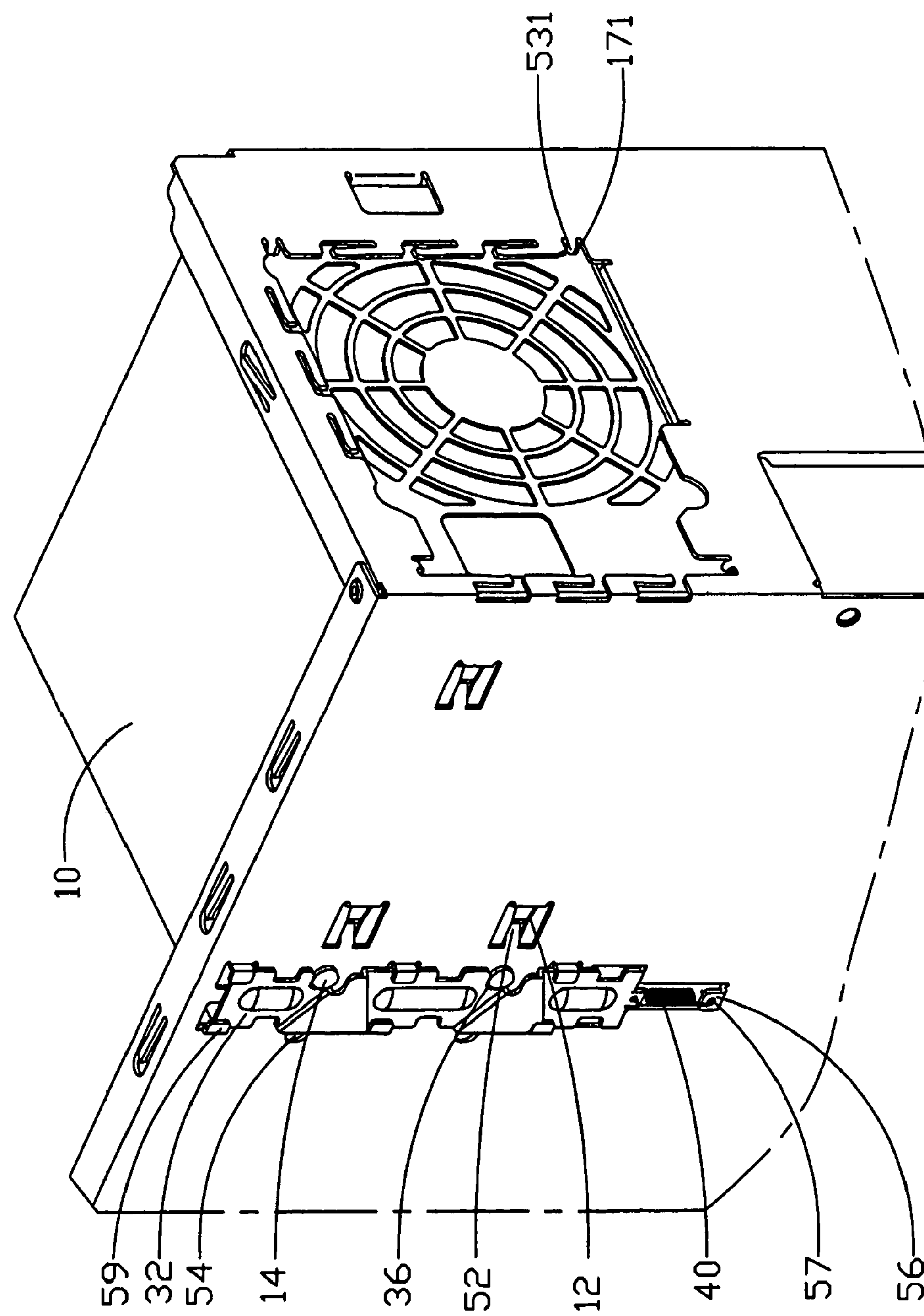
FIG. 5 is a complete assembled view of FIG. 1.

Referring also to FIGS. 4 and 5, in assembly, the pairs of the cutouts 39 respectively receive the corresponding catches 59, whereby the main body 32 of the retainer 30 abuts an outer side of the side panel 51, and is movably retained in the sliding space defined by the catches 59. The handle 38 extends into the wide portion of the receiving hole 58 and then slides downwardly, until a bottom of the handle 38 abuts against a bottom of the wide portion of the receiving hole 58. The catches 59 are misaligned with the cutouts 39. An upper end of the spring 40 engages in the through aperture 37 of the main body 32, and a lower end of the spring engages in the through aperture 57 of the side panel 51.

The screws 14 are engaged in the threaded holes 16 of the power supply 10, with parts of the screw poles remained out of the thread holes 16. The power supply 10 is placed in the chassis 50 with said parts of the screw poles 14 extending into front ends of the slots 54 and then abutting against inner sides of the receiving portions 33. At this time, the screw caps 141 totally extend out through the slots 54 of the side panel 51.

The power supply 10 is pushed toward the rear panel 53 of the chassis 50. The locking tabs 52 of the side panel 51 enter the wide portions of the locking holes 12 of the power supply 10, and then the narrow portions of the locking tabs 52 slide into the narrow portions of the locking holes 12, whereby the locking tabs 52 are locked in the locking holes 12. During the moving process of the power supply 50, because the screw caps 141 are located under the guiding surface 331, the screw caps 141 exert an upward force to the guiding surface 331. The retainer 30 is thereby pushed upwardly, and the spring 40 is stretched.

When the screw caps 141 are moved to the ends of the guiding surfaces 331, the spring 40 reverts to its original state. The retainer 30 is therefore pulled downwardly by the spring 40, until the screw caps 141 engage with the corresponding locking portions 36, thereby preventing the power supply 10 from moving reversely (see FIG. 5). At the same time, the rear wall 17 of the power supply 10 abuts the rear panel 53 of the chassis 50, with the tabs 531 engagingly received in the locating holes 171 of the power supply 10. The sidewall 13 of the power supply 10 abuts against the blocking plate 532 of the chassis 50. The bottom wall 19 of the power supply 10 is supported by the support plate 532 of the chassis 50, with the resilient fingers 5331 abutting against the bottom wall 19 for preventing Electromagnetic Interference. The power supply 10 is thus secured in the chassis 50.

In detaching the power supply 10 from the chassis 50, the handle 38 is pushed upwardly so that the retainer 30 is moved upwardly, until the stopping surfaces 332 abut the screw caps 141. When the retainer 30 continues to be moved upwardly, the screw caps 141 are slid from the locking portions 36 to the lower ends of the guiding surfaces 331 by the stopping surfaces 332. Then, the screw caps 141 leave the slots when the power supply 10 moves away from the side panel 51. The power supply 10 is thus taken out from the chassis 50.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A mounting apparatus for securing a device, the device defining at least one locking hole in a sidewall thereof, the mounting apparatus comprising:

a chassis comprising a side panel, the side panel comprises a plurality of catches and a slot, at least one locking tab formed from the side panel for engaging with said locking hole of the device;

a retainer slidably attached to the side panel of the chassis by the catches, the retainer comprising a receiving portion corresponding to the slot of the chassis, the receiving portion having a guiding surface, a locking portion formed at the retainer near a distal end of the guiding surface; and a sliding element arranged at the sidewall of the device;

wherein the sliding element slides along the slot of the chassis and along the guiding surface of the receiving portion of the retainer, and then snappingly engages with the locking portion of the retainer, said locking tab of the chassis is thereby retained engaging with said locking hole of the device.

2. The mounting apparatus as described in claim 1, wherein the retainer defines a plurality of cutouts for receiving the catches of the chassis.

3. The mounting apparatus as described in claim 1, wherein said locking hole of the device has a wide portion and a narrow portion, said locking tab of the chassis has a wide portion and a narrow portion.

4. The mounting apparatus as described in claim 1, wherein the sliding element comprises a screw which has a screw cap, and wherein when the screw slides along the slot, the screw cap is received in the receiving portion of the retainer.

5. The mounting apparatus as described in claim 1, wherein the chassis further comprising a vertical panel perpendicular to the side panel, the device abuts against the vertical panel.

6. The mounting apparatus as described in claim 5, wherein a plurality of tabs is formed inwardly from the vertical panel, a plurality of locating holes is defined in the device for engaging with the tabs.

7. The mounting apparatus as described in claim 5, wherein a support plate is formed inwardly from the chassis for supporting the device.

8. The mounting apparatus as described in claim 5, wherein a blocking plate is formed inwardly from the vertical panel, for sandwiching the device with the side panel.

9. The mounting apparatus as described in claim 5, wherein the guiding surface is slanted, having a lower end near the vertical panel, and a higher end away from the vertical panel, the locking portion is near the lower end of the guiding surface.

10. The mounting apparatus as described in claim 9, further comprising a resilient element, one end of the resilient element being connected to the side panel, the other end being connected to the retainer, wherein the sliding element is slid from the higher end of the guiding surface to the lower end, and then snaps into the locking portion via reverting force of the resilient element.

11. The mounting apparatus as described in claim 1, wherein the retainer further comprises a handle, the side panel defines a receiving hole to receive the handle.

12. A computer chassis comprising:

a side panel comprising at least one slot and at least one locking tab;

a rear panel perpendicular to the side panel;

a retainer resiliently and slidably attached to the side panel, the retainer forming at least one receiving portion corresponding to said slot, said receiving portion having a slanted guiding surface, a locking portion being formed at the retainer next to an end of the guiding surface; and a power supply, one sidewall of the power supply defining at least one locking hole for engagingly receiving said locking tab of the side panel, at least one sliding element arranged at said sidewall to extend through said slot and be received in said receiving portion of the retainer;

wherein when the power supply is moved toward the rear panel, said sliding element slides along the guiding surface thereby moving the retainer, and then snappingly engages with said locking portion, the power supply is thus retained in the chassis.

13. The computer chassis as described in claim 12, wherein said end of the guiding surface is lower and closer to the rear panel than the other end of the guiding surface.

14. The computer chassis as described in claim 13, further comprising a spring connecting the retainer and the side panel, wherein when said sliding element slides along said guiding surface and reaches said end of the guiding surface, said sliding element snappingly engages with said locking portion via reverting force of the spring.

15. The computer chassis as described in claim 12, wherein a handle is formed from the retainer, a receiving hole is defined in the side panel to receive the handle.

16. The computer chassis as described in claim 12, wherein the rear panel defines an opening, a plurality of tabs is formed from the rear panel for extending into a plurality of locating holes of the power supply.

17. The computer chassis as described in claim 12, wherein a support plate is formed from the rear panel for supporting the power supply.

18. The computer chassis as described in claim 12, wherein a blocking plate is formed from the rear panel for sandwiching the power supply with the side panel.

19. A mounting apparatus for securing a device, comprising:

a chassis comprising a first panel, and a second panel perpendicular to the first panel, wherein a supporting plate is formed from the second panel of the chassis for supporting the device, a slot is defined in the first panel;

a retainer slidably attached to the first panel, the retainer forming a slanted surface, and a locking portion near an end of the slanted surface; and a sliding element arranged at a sidewall of the device;

wherein the sliding element extends through the slot and slides along the slanted surface of the retainer; when the device is stopped by the second panel and supported by the supported plated, the sliding element snappingly engages into the locking portion of the retainer.

20. The mounting apparatus as described in claim 19, wherein the first panel forms at least one locking tab, the sidewall of the device defines at least one locking hole for receiving said locking tab.

* * * * *